May 31, 1938.  J. HARRINGTON, JR  2,118,883
ASSEMBLING DEVICE
Filed Jan. 8, 1937

INVENTOR
Joseph Harrington, Jr.
By his attorney
Victor Cobb.

Patented May 31, 1938

2,118,883

UNITED STATES PATENT OFFICE 2,118,883

ASSEMBLING DEVICE

Joseph Harrington, Jr., Wenham, Mass., assignor to United Shoe Machinery Corporation, Paterson, N. J., a corporation of New Jersey Application January 8, 1937, Serial No. 119,649

8 Claims. (Cl. 12—17)

This invention relates to the manufacture of shoes and is herein illustrated as embodied in a machine for use in locating in superposed relation two shoe part blanks of similar outline but of different sizes with an adhesive between them, and for subsequently pressing the two blanks together.

In United States Letters Patent No. 2,065,692, granted December 29, 1936, upon an application filed in my name, there is disclosed a method of preparing a complemental insole-outsole combination which comprises channeling an insole, locating the insole upon an outsole with an adhesive between the two, pressing them together and thereafter splitting the laminated blank into an outsole having a projection on its forepart and an insole having a similarly located complementary shaped opening.

The present invention relates to a machine for facilitating the proper locating in superposed relation of two blanks of different size and for subsequently pressing them together. In the illustrated embodiment of the invention, a base is provided with suitable gages for locating an insole and an outsole in superposed relation; and, hinged to the base is a presser which is normally held in raised position but, by the manipulation of a treadle, may be caused to press the insole and outsole together.

This and other features of the invention, including certain details of construction and combinations of parts will be set forth as embodied in an illustrated machine and pointed out in the appended claims.

Referring to the accompanying drawing.

Figure 1:
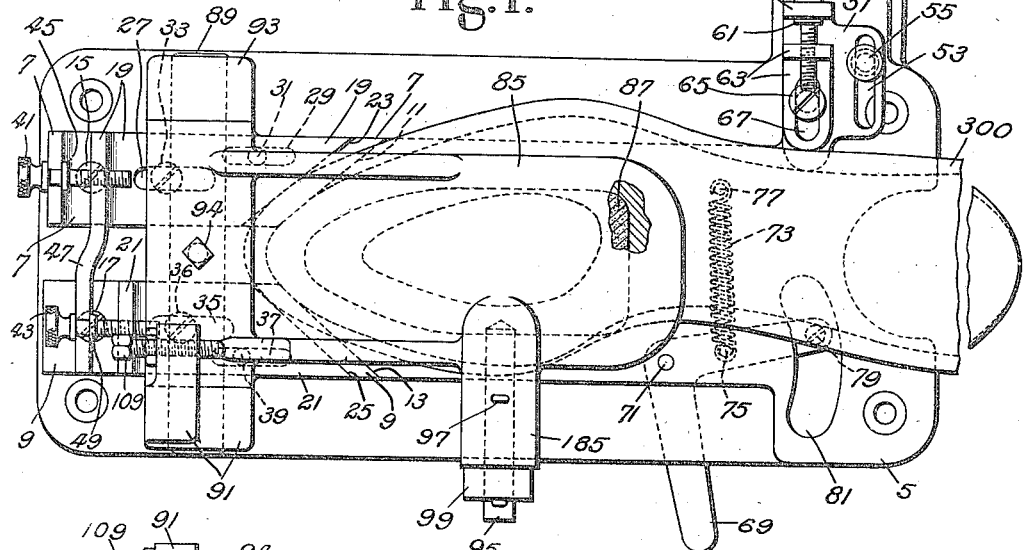
Fig. 1 is a plan of a machine in which the present invention is embodied, an insole and an outsole being shown in process of being pressed together.

As herein illustrated the completed insole-outsole combination is intended for use in the manufacture of a welt shoe. To this end, the insole 100 is channeled as indicated at 200 and has an outline similar to but somewhat smaller than that of the outsole 300. The central forward portion of the insole is coated with an adhesive, and the corresponding portion of the outsole is similarly coated. As illustrated, the coated areas 400, 500 correspond in outline to the outline of the base of the projecting portion which is ultimately to be formed on the outsole after the laminated blank has been properly split.

In order to facilitate the proper location of the two articles in superposed relation, a base 5 having a flat article-supporting surface carries a plurality of locating gages and a presser. As herein illustrated the insole 100 which has a smaller outline than that of the outsole, is placed first on the support 5 and then the outsole 300 is superposed upon it. The toe-end gage for the insole comprises two thin bars 7, 9 having respectively article-engaging faces 11, 13 which converge toward each other. These two bars 7, 9 are fastened to the base 5 respectively by screws 15, 17. Although the insole toe-end gage is shown as made of two bars 7, 9, it should be understood that it might be made of a single piece. The toe-end gage for the outsole 300 comprises two thin flat bars 19, 21 having article-engaging faces 23, 25 which converge toward each other. The bar 19 has in it two elongated slots 27, 29. A pin 31 driven into the bar 7 and the base 5 extends up through the slot 29, and the stem of a screw 33 passes through the slot 27, through the bar 7 and is threaded into the base 5. The bar 19 is thus guided for longitudinal sliding movement along the bar 7. The bar 21 is similarly mounted on the bar 9, said bar 21 having in it a slot 35 through which passes the stem of a screw 36 and a slot 37 into which extends the upper end of a pin 39. The two parts 19, 21 of the outsole toe-end gage are thus adjustable, one on the part 7 of the insole gage and the other on the part 9 of the insole gage.

Means are provided for adjusting the parts 19, 21 in unison or, if desired, for adjusting the part 21 while maintaining the part 19 stationary. To this end, adjusting screws 41, 43 are provided. The adjusting screw 41 is rotatably mounted in the upturned left-hand end of the bar 7 but is held from longitudinal movement by the head of the screw and a small collar 45, the stem of this screw being threaded through the upturned left-hand end of the bar 19. This upturned end of the bar 19 has integral with it a cross-bar 47 which extends crosswise of the machine so that its free end is located above the bar 9. The adjusting screw 43 is rotatably mounted in the cross-bar 47 near the free end of said cross-bar but is held from longitudinal movement by the head of the screw and a small collar 49, the stem of this screw being threaded through the upturned left-hand end of the bar 21. With this construction, turning the adjusting screw 41 will adjust both parts 19, 21 of the outsole toe-end gage in unison, while turning the adjusting screw 43 will adjust only the part 21. The purpose of adjusting one part with respect to the other is to change more or less the widthwise location of the toe portion of the outsole with respect to that of the insole.

Two superposed gages, referred to herein as shank gages, are provided for engaging respectively the edge of the outsole and the edge of the insole in the localities of their shanks. The insole gage 51 is provided with a slot 53, the direction or extent of which is crosswise of the base, through which passes the stem of a clamping screw 55, said screw being threaded into the base. At its end remote from the work, the gage 51 is formed with an upwardly extending ear 57. An adjusting screw 59 is rotatably mounted in this ear but is held from longitudinal movement by the head of the screw and a small collar 61, the stem of this screw being threaded through an upwardly extending end of an outsole-shank gage 63. A clamping screw 65 passes through a slot 67 in the gage 63 as well as through a registering slot in the gage 51 and is threaded into the base. When the clamping screw 65 has been loosened, the adjusting screw 59 may be turned to adjust the outsole-shank gage 63 with respect to the insole-shank gage 51. When both screws 65, 55 have been loosened, the gages may be adjusted by hand in unison.

Yielding means is provided for holding the insole against the shank gage 51. For this purpose a bell-crank lever 69 is pivoted at 71 to the under side of the base 5 and is yieldingly urged at all times to swing in a counterclockwise direction, as viewed in Fig. 1, by a tension spring 73, said spring being held at one end by a pin 75 on the bell-crank lever and at the other end by a pin 77 on the base. One arm of the bell-crank lever 69 projects out from under the base and serves as a handle by which the bell-crank lever may be swung out against the force of the spring 73. The other arm of the bell-crank lever 69 carries at its outer end a screw 79 having a smooth stem and a lower threaded end of reduced diameter. The smooth stem of this screw extends up through a segmental slot 81 in the base and above the surface of the base for a distance slightly less than the thickness of the insole 100.

In the operation of the device, when the toe-end gages and the shank gages have been adjusted into proper positions, the operator swings the bell-crank lever 69 in a clockwise direction, places an insole on the base 5 with its toe end engaging the converging faces 11, 13 of the insole toe-end gage and its shank portion engaging the insole-shank gage 51, and releases the bell-crank lever, the pin 79 then pressing the edge of the shank portion of the insole against the shank gage 51. Upon the insole thus properly located and held in place, the operator superposes the outsole 300 with its toe end engaging the converging faces 23, 25 of the two-part outsole gage and its shank portion engaging the shank gage 63. Having thus located the articles in proper superposed position, the operator manipulates a treadle 83 to press the articles together.

Figure 2:
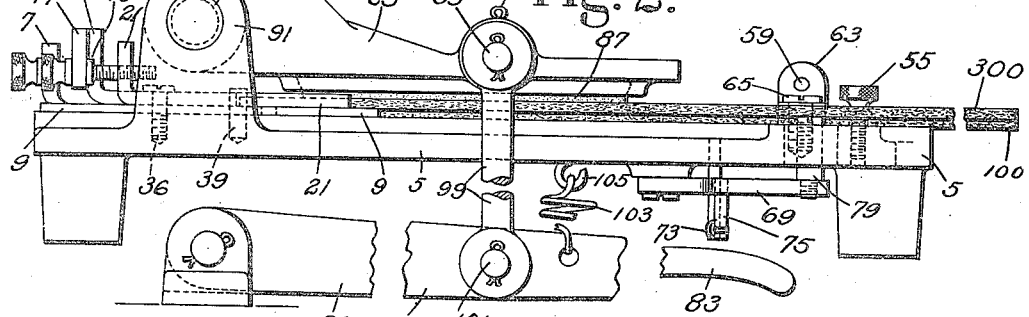
Fig. 2 is a side elevation of the machine.
Figure 3:
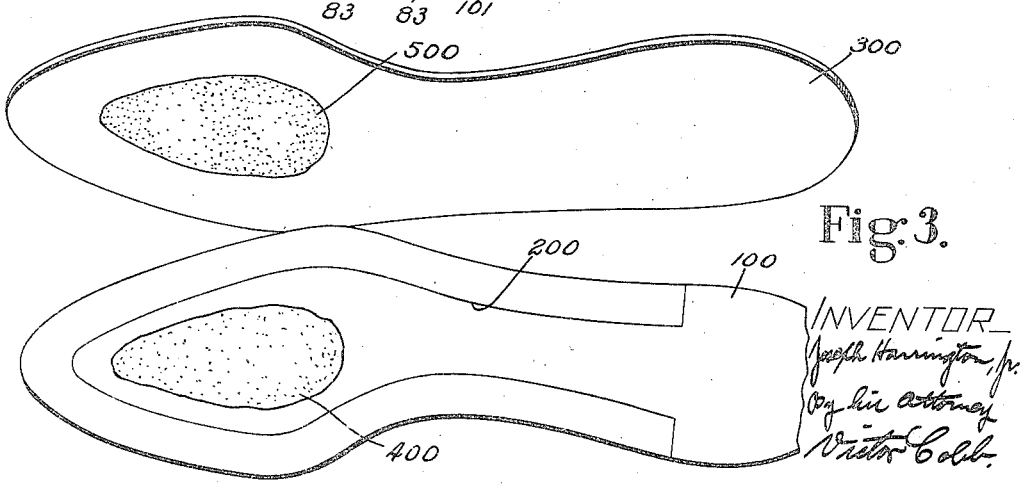
Fig. 3 is a perspective showing an insole and outsole each carrying a coating of cement on its forepart, said insole and outsole being ready to be located in superposed relation and pressed together.

The pressing mechanism comprises a presser 85 preferably carrying a pad 87 of a material such as felt for contacting with the uppermost article when the presser is held down as shown in Figs. 1 and 2. The hub of the presser is fastened to a rod 89 by a set screw 94, the opposite ends of the rod being received in bores in upstanding lugs 91, 93 of the base. The presser has at one side near its middle a boss 185 having a horizontal bore to receive a pin 95 which is fastened in place by a cotter pin 97. Pivoted about the outer end of this pin is the upper end of a link 99 held on the pin by another cotter pin, the lower end of the link being pivoted about a stud 101 carried by the treadle 83. A tension spring 103, fastened at its lower end to the treadle and at its upper end to a hook 105 carried by the base, normally holds the treadle and the presser 85 in raised position in which a surface 107 on a boss formed on the presser contacts with the end of an adjustable stop screw 109 threaded through an upright ear which is integral with the lug 91. In the position of parts shown the threadle has been depressed and the presser is operating to press the two articles together.

Although the invention has been set forth as embodied in a particular machine especially adapted to operate upon particular articles, it should be understood that the invention is not limited in the scope of its application to the particular machine nor to operation upon the particular articles which have been shown and described.

Having thus described my invention, what I claim as new and desire to secure by Letters Patent of the United States is:—

1. A device for locating an insole and an outsole in predetermined superposed relation and for pressing them together having, in combination, a base, two gages mounted on the base for relative adjustment with respect to each other and located one above the other for engaging the articles in localities near one of their ends, two gages mounted on the base, located one above the other and relatively adjustable with respect to each other for engaging the articles at their sides in localities remote from the localities engaged by the first-named two gages, and means also mounted on the base for pressing the articles together.

2. A device for locating two articles in predetermined superposed relation and for pressing them together having, in combination, two gages located one above the other, one gage being adjustable with respect to the other in a given path, two gages located one above the other, one of said last-named gages being adjustable with respect to the other in a path at an angle to the first-named path, an article-supporting base by which all the gages are carried, and a presser for pressing the articles together, said presser being also carried by the base.

3. A device for locating two articles in predetermined superposed relation and for pressing them together having, in combination, two gages located one above the other, one gage being adjustable with respect to the other in a given path, two gages located one above the other, one of said last-named gages being adjustable with respect to the other in a path at an angle to the first-named path, an article-supporting base by which all the gages are carried, and a presser pivoted on the base for pressing the articles together, said presser being also carried by the base.

4. A device for locating two sole-shaped articles in predetermined superposed relation having, in combination, an article-supporting base, a toe gage for one of the articles, said gage being mounted on the base and having converging article-engaging faces adapted to engage the article adjacent to its toe end, and a two-part toe gage also having converging article-engaging faces adapted similarly to engage the second article, the two parts of the second-named gage being adjustable in unison with respect to the first-named gage, and one part of the two-part gage being adjustable with respect to the other part.

5. A device for locating two sole-shaped articles in predetermined superposed relation having, in combination, an article-supporting base, a toe gage for one of the articles, said gage being mounted on the base and having converging article-engaging faces adapted to engage the article adjacent to its toe end, and a two-part toe gage also having converging article-engaging faces adapted similarly to engage the second article, the two parts of the second-named gage being mounted on the first-named gage for adjustment in unison and for adjustment one with respect to the other.

6. A device for locating two sole-shaped articles in predetermined superposed relation having, in combination, an article-supporting base, a toe gage for one of the articles, said gage being mounted on the base and having converging article-engaging faces adapted to engage the article adjacent to its toe end, and a two-part toe gage also having converging article-engaging faces adapted similarly to engage the second article, the two parts of the second-named gage being slidably mounted on the first-named gage, and means for adjusting the two parts in unison and for adjusting one part with respect to the other.

7. A device for locating two sole-shaped articles in predetermined superposed relation having, in combination, an article-supporting base, a toe gage for one of the articles, said gage having converging article-engaging faces adapted to engage the article adjacent to the toe end, a two-part toe gage also having converging article-engaging faces adapted similarly to engage the second article, the two parts of the second-named gage being adjustable in unison and one part being adjustable with respect to the other, and shank gages relatively adjustable with respect to each other and adapted to engage edges of the articles.

8. A device for locating two sole-shaped articles in predetermined superposed relation having, in combination, an article-supporting base, a toe gage for one of the articles, said gage having converging article-engaging faces adapted to engage the article adjacent to its toe end, a two-part toe gage also having converging article-engaging faces adapted similarly to engage the second article, the two parts of the second-named gage being adjustable in unison and one part being adjustable with respect to the other, shank gages relatively adjustable with respect to each other and adapted to engage edges of the articles, and means extending above the article-supporting surface of the base a distance less than the thickness of the lowermost article for yieldingly holding the lowermost of the two articles against its shank edge.

JOSEPH HARRINGTON, Jr.